US006856342B1

(12) United States Patent
Raposa et al.

(10) Patent No.: US 6,856,342 B1
(45) Date of Patent: Feb. 15, 2005

(54) CONTROL CIRCUITRY FOR HIGH SPEED VIDEO CAMERA OPERATION

(75) Inventors: John R. Raposa, Warren, RI (US); Daniel P. Thivierge, Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/565,237

(22) Filed: Apr. 28, 2000

(51) Int. Cl.[7] .......................... H04N 9/47; H04N 5/225; H04N 7/18
(52) U.S. Cl. ........................... 348/81; 348/170; 348/138
(58) Field of Search ................................ 348/138, 180, 348/81–82, 159, 61, 64, 169–172; 396/263, 155, 180, 429; 324/178, 179

(56) References Cited

U.S. PATENT DOCUMENTS

| | | | | |
|---|---|---|---|---|
| 4,385,227 A | * | 5/1983 | Bridges ........................... | 377/2 |
| 4,713,686 A | * | 12/1987 | Ozaki et al. ................. | 348/157 |
| 5,532,632 A | * | 7/1996 | Kent ........................... | 327/141 |
| 5,926,780 A | * | 7/1999 | Fox et al. ................... | 702/142 |
| 6,367,800 B1 | * | 4/2002 | Sheck et al. ................. | 273/372 |
| 6,618,075 B2 | * | 9/2003 | Tomita ........................ | 348/157 |

* cited by examiner

*Primary Examiner*—Chris Kelley
*Assistant Examiner*—Dave Czekaj
(74) *Attorney, Agent, or Firm*—James M. Kasischke; Michael F. Oglo; Jean-Paul A. Nasser

(57) ABSTRACT

A device for controlling a video camera in underwater high speed photography in a first aspect includes a plurality of spaced break screen or sense coil members, a projectile for launch through the series of break screen or sense coil members, a video camera operated to video at a predetermined timing upon release of the projectile, and a source of illumination to aid in the video photography. A trigger device such as a break screen or sense coil is positioned immediately up-range of the video camera. With a time delay programmed into a Programmable Array Logic (PAL), a control circuitry receives the trigger information and creates a timed signal to control the operation of the video camera. In accordance with another aspect of this invention, the control circuitry includes discrete logic devices programmed such that gating of the video camera is controlled by the control circuitry at the time the projectile passes the lens of the camera.

9 Claims, 3 Drawing Sheets

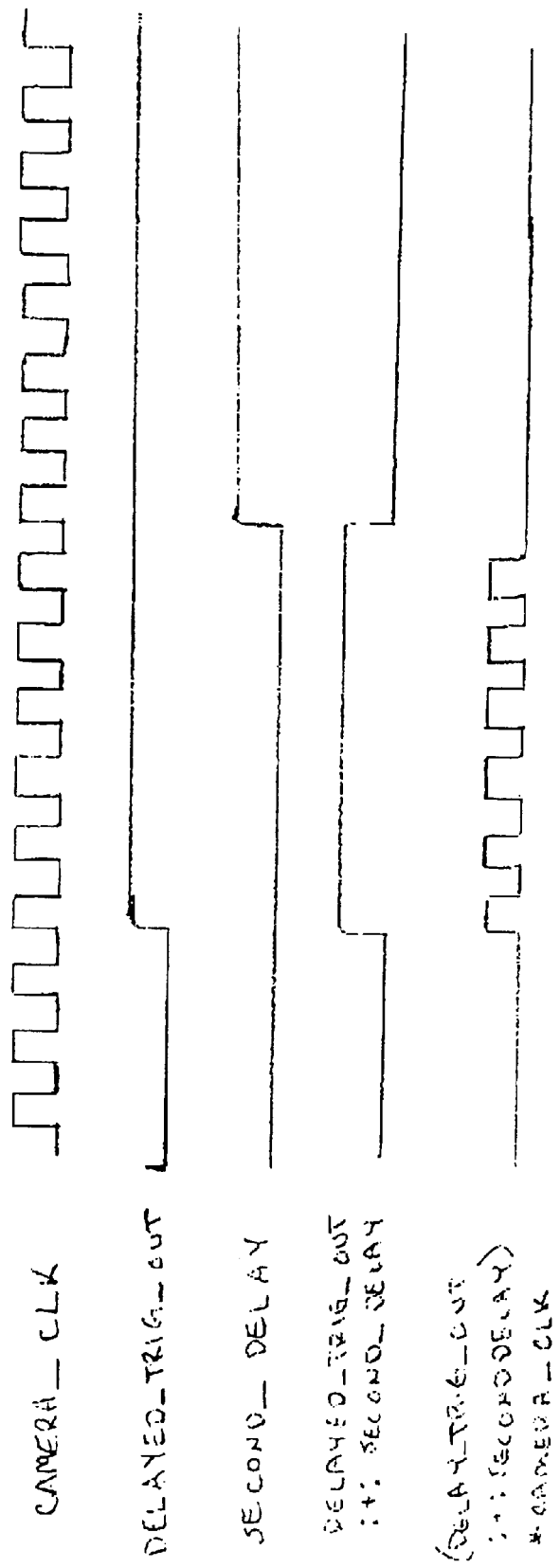

CONTROL CIRCUITRY FOR HIGH SPEED VIDEO CAMERA OPERATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates high speed photography, and to a circuit for triggering a video camera located between two sensors. More specifically, the video camera is triggered by a projectile passing through a break screen on an underwater range.

(2) Description of the Prior Art

The Adaptable High Speed Underwater Munition (AHSUM) project needed a method to obtain video images of underwater projectiles during the course of their test series. Prior to this time, there was no satisfactory means of obtaining the video images that were needed, nor was there a device applicable to a variety of conditions.

The following patents, for example, disclose various types of video photography, including underwater photography and circuits in connection therewith, but do not disclose a device for controlling an underwater video camera for the purpose of taking underwater video of a high speed projectile.

U.S. Pat. No. 4,335,944 to Marshall;
U.S. Pat. No. 4,418,999 to Baxter;
U.S. Pat. No. 4,447,896 to Rines;
U.S. Pat. No. 4,713,686 to Ozaki et al.; and
U.S. Pat. No. 4,970,597 to Shepard.

Specifically, the patent to Marshall discloses improvements in underwater elapsed time strobe-camera apparatus and the like involving sonar-triggering by a sonar beam generated co-axially with and about the camera lens axis and, as a result of novel circuits, size-reduction and packaging, adaptability for portability, with ancillary novel features of automatic predetermination of number of pictures and indication thereof.

Baxter discloses a synchronizing circuit which enables a desired phenomena to occur, such as the discharge of a flash illuminating means at a precise point along the path of travel of an article irrespective of the speed of the article in that path. The circuit utilizes two spaced sensors upstream of the precise point. The sensors are operable to detect the passage of the article and each sensor is connected to respective counter. When sensor detects the passage of the article it starts its respective counter counting in one direction at one particular counting rate. When the second sensor detects the passage of the article it causes its respective counter to count in the opposite direction from the value of the count in the first count at a different but faster counting rate. The circuit includes gate means which determine when the count has returned to a predetermined count to then cause said phenomena to occur.

The patent to Rines is concerned with problems of energy conservation and more effective utilization at desired critical times only in, for example, sonar-triggered underwater elapsed time strobe photography of objects or scenes or in applications having similar problems; and accomplishing such and other ends by restricting optical and sonar monitoring to relatively low periodicity intervals until the desired object has come within range, whereupon the apparatus automatically changes mode to take rapid successive strobe photographs or other records supplemented by contemporaneous sonar recording.

The patent to Ozaki et al. discloses a high speed, instantaneous multi-image recorder having a video camera, sensor unit and light projector. A frame memory is connected to the video camera, a flash tube is joined to the light projector, and a retarder is joined to the sensor unit. The flash tube is connected to the retarder, and a monitor is connected to the frame memory. The video camera, sensor unit and light projector are directed toward a moving object which is, for example, a golf club. When the golfer swings the club, the sensor unit detects the club, the light projector flashes, and the video camera picks up the golf ball and club head at the moment of impact. Thus, the video camera catches many instantaneous poses within a frame. Many such images picked up in a signal frame of the video camera are displayed on the monitor screen for analysis.

Shepard discloses a method of imaging a high speed event. A multiplicity of frames, or image fields, are output from a camera which scans repeated occurrences of the event. Selected data representing individual portions of frames are accumulated in essentially random order. The selected data are used to construct a composite image of the high speed event.

It should be understood that the present invention would in fact enhance the functionality of the above patents by providing a control device for an underwater video camera and triggering the underwater video camera at the precise time necessary for acquiring desired video frames, particularly in a test environment.

SUMMARY OF THE INVENTION

Therefore it is an object of this invention to provide a device for controlling a video camera in underwater photography.

A further object of the invention is to provide a circuitry which is an accurate and inexpensive method to control a timing of operation of a video camera in underwater high speed photography.

Yet another object of this invention is to provide a device and circuitry for controlling a timing operation of a video camera in underwater high speed photography which is simple to manufacture and easy to use.

In accordance with one aspect of this invention, there is provided a device for controlling a video camera in underwater high speed photography. The device includes a plurality of spaced sensors, a projectile for launch through the series of sensors, a camera or video camera having a shutter opened at a predetermined timing prior to release of the projectile and closing at a predetermined timing subsequent to release of the projectile, and an illumination source for providing a light source at the same time as the projectile passes in front of the camera. A sensor is positioned immediately-uprange of the camera. A control circuit receives the sensor information and creates a timed signal to control the activation of the video camera.

In accordance with another aspect of this invention, the control circuitry includes a first D flip flop for receiving a signal output from a break screen upon passing of a projectile therethrough, the first D flip flop additionally having a constant voltage applied thereto and a resulting latched output signal. An AND gate receives an output signal of the first D flip flop, the AND gate additionally having a clock signal and a resulting output clock signal only when the latched output signal from the first D flip-flop is high. An N-bit counter receives the output clock signal from the AND gate. The N-bit counter provides a count to delay generation logic. Upon lapse of a predetermined length of time the delay generation logic provides a delayed control signal. A second D flip-flop receives the delayed control signal, and additionally has a constant voltage applied thereto and a resulting latched output signal, wherein a rising edge of an output generated by the second D flip-flop identifies a beginning of a camera activation window. A second AND gate receives the output signal of the second D flip flop. The second AND gate additionally receives a clock signal. The second AND gate outputs a second output clock signal to a second independent N-bit counter. A second delay generation logic block receives the output of the second N-bit counter, and outputs a second delayed control signal upon lapse of a predetermined count. A third D flip-flop receives the second delayed control signal from the second delay generation logic, and additionally has a constant voltage applied thereto and a resulting latched output signal. A rising edge of the output generated by the third D flip-flop identifies an end of the camera activation window. An exclusive OR gate receives outputs from each of the second D flip-flop and the third D flip-flop, the exclusive OR gate producing a high pulse from the time delayed trig out goes high to the time second delay goes high. The output of the exclusive OR gate is compared using an AND Gate with an externally generated camera clock square wave. The camera clock signal is provided by a separate function generator. The frequency of the square wave dictates the number of pulses that will occur in the activation window and hence the number of times the camera will be gated. The output of the AND gate is buffered via a separate non-inverting buffer and then sent to the camera trigger.

The camera is controlled by the control circuitry at the exact moment the projectile passes the lens of the camera.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 is a timing diagram of the preferred embodiment of the present invention.

DESCRIPTION OF THE PREFERRED EMBODIMENT

In general, the present invention is directed to a control circuitry for controlling an underwater video camera for the purpose of taking underwater video images of a high speed projectile tested in the Adaptable High Speed Underwater Munition (AHSUM) project. The control circuitry essentially senses when the projectile has passed through a break screen or sensing coil and provides a trigger signal in response thereto. The control circuitry uses this trigger to enable its novel timing scheme to turn on the video camera at the exact time required to acquire the video images.

Figure 1:
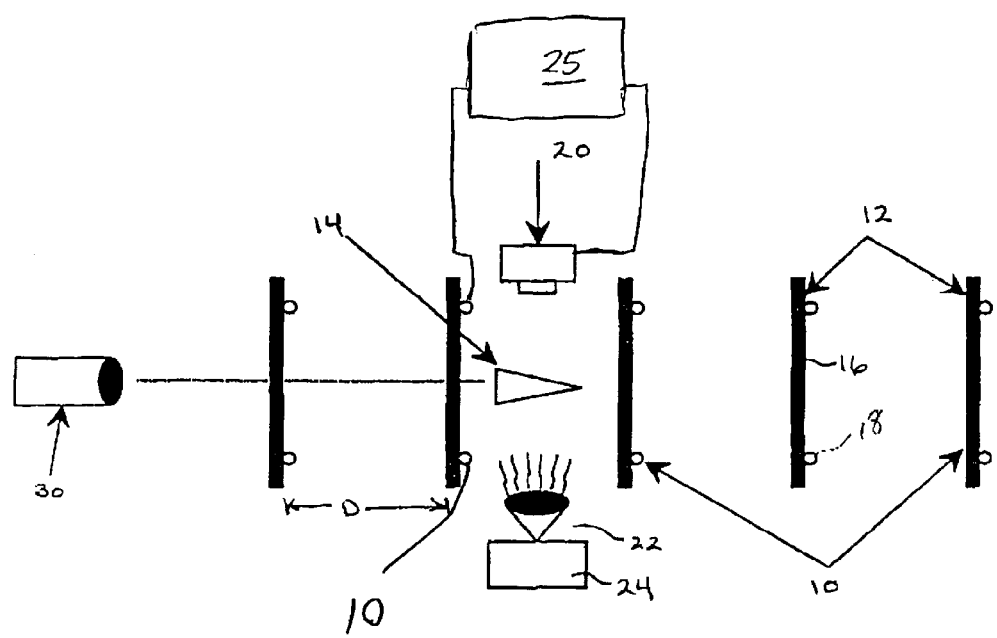
FIG. 1 is a plan view of a first preferred embodiment of the present invention.

Referring first to FIG. 1, there is shown a simple diagram of the test set up including a plurality of sensing devices 10 all spaced a predetermined distance D apart. These sensing devices 10 can be either sensing coils or break screens. Each sensing device 10 is mounted to a steel plate 12 having an opening formed therein for passage of a projectile 14 therethrough as discharged from a gun 30. The opening may be of any shape suitable for a clean passage of the projectile 14, however, a circular opening was utilized in the actual device. The steel plate 12 is not only used as a fastening surface for the sensing device 10, but as a barricade to protect the surrounding facility and personnel in the event the projectile 14 strays off course.

The sensing device 10 may be further constructed as a break screen having clear plastic sheets or film 16, similar to a transparency. A continuous resistive trace (not shown) winds its way back and forth from one side of the film 16 to the other and is sandwiched between two of the sheets of film 16. It is understood that alternative forms of capture may be used in place of the sheets of film 16, and such modifications are intended to be included within the scope of the invention. Both ends of the resistive trace are connected to the input of a control circuitry described in detail in co-pending application entitled Underwater High Speed Projectile Break Screen Based Speed Sensing Circuit.

Referring further to FIG. 1, there is additionally shown a video camera 20 opposed to a source of illumination such as an incandescent light 22. The video camera 20 may be mounted to a base 24 if desired. While the incandescent light 22 is used for the purposes of illustration, other sources of illumination having the same or similar constant output may be suitable for use in the present invention.

It is not possible to operate a standard video camera and capture a series of images of the projectile passing by at high speed. Therefore, a high speed gated intensified video camera 20 must be used to take high speed video images. By providing the video camera with a packet of high speed digital trigger pulses at the exact time the projectile 14 is passing allows the user to automatically gate the video camera 20 and gather multiple images of the projectile 14. The number of pulses included in the pulse packet dictates the number of images taken by the camera 20. The control circuitry 25 is activated when the projectile 14 passes through the break screen or voltage sense coil 10 located immediately uprange from the camera equipment 20.

The control circuitry 25 joined to the camera 20 is activated when the projectile passes through the break screen or voltage sensing coil 10 located immediately up-range of the camera equipment 20. A time delay must be incorporated to compensate for the time required for the projectile to reach the camera equipment after passing through the break screen or voltage sense coil.

Figure 2:
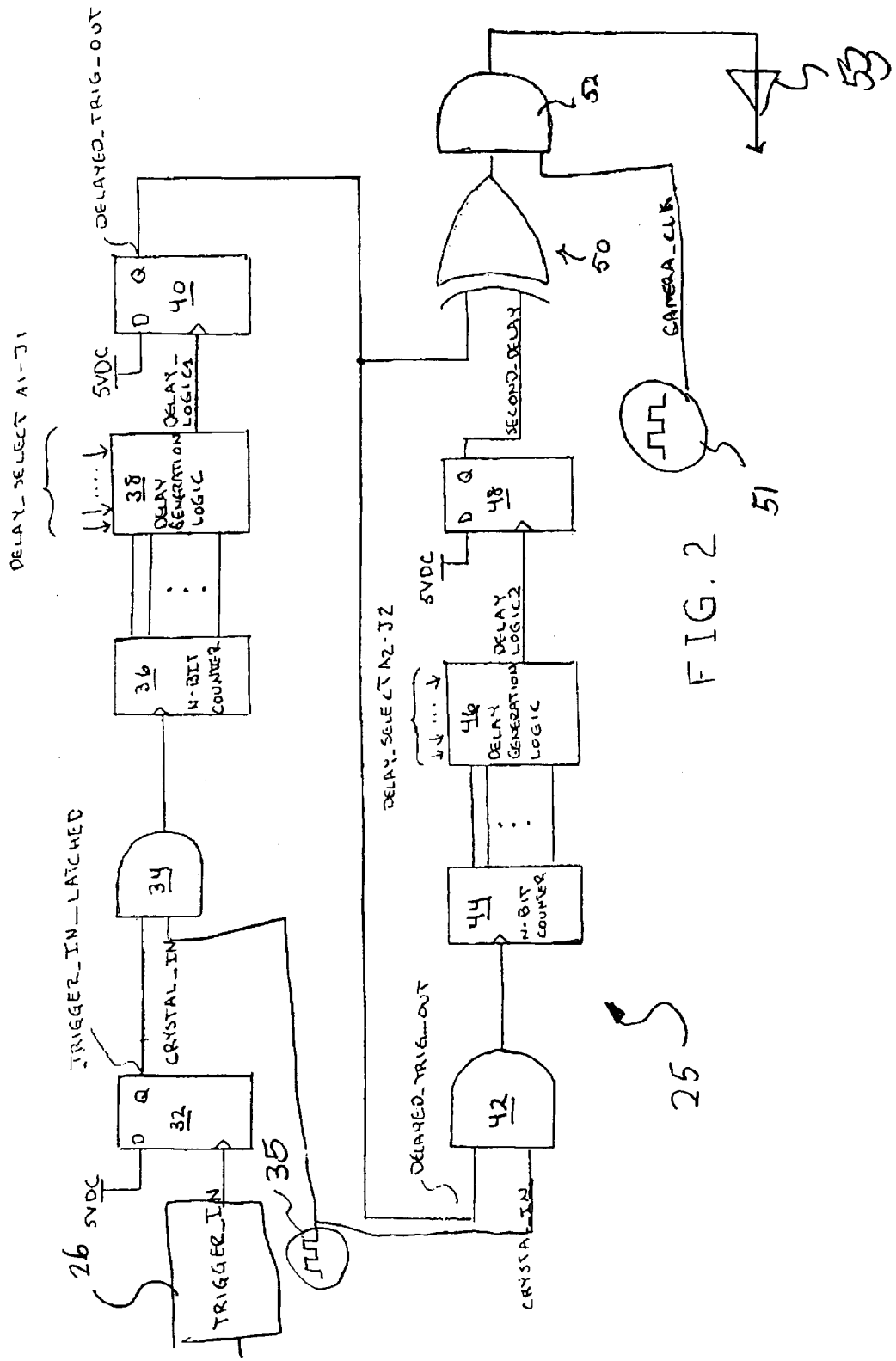
FIG. 2 is a diagrammatic view of the circuitry used in the preferred embodiment of the invention.

FIG. 2 and FIG. 3 describe the control circuitry 25 that receives the break screen or coil voltage trigger information and then creates the appropriate timed trigger signal to control the underwater camera 20. The control circuitry 25 receives the input trigger information either as an open circuit from the break screen 10 or as a voltage spike from a sensing coil which detects the presence of a magnetic projectile 14 passing through it. This signal is sent to an input voltage comparator 26 that outputs a logical high pulse (5 Volts). This pulse is sent to the input of a timing circuitry which may be programmed in a programmable array logic (PAL) device. Referring now in detail to FIG. 2, the circuitry programmed in the PAL is shown therein. All discrete logic labels are used in the description strictly for explanation purposes. The signal and component labels match those appearing in the figures. The waveforms produced by the control circuitry 25 in order to properly control the high speed video camera 20 are depicted in FIG. 3.

The voltage comparator signal is sent to the clock input of a first D-flip-flop 32 that is programmed internally in the PAL. The D-input of the first flip-flop 32 is permanently connected to a logical high source (5 Volts). The first flip-flop 32 provides a latched logical high signal when a projectile passes through the sensor 10. Flip flop 32 prevents output changes in the event of fluctuations at the comparator output. The output of the first flip-flop 32 is labeled as TRIGGER_IN_LATCHED.

This signal of TRIGGER_IN_LATCHED is sent to a first AND gate labeled 34. The other input of the AND gate 34 is a 1 MHz square wave generated by a quartz crystal based oscillator 35 and is labeled CRYSTAL_IN. Oscillator 35 preferably provides a 1 MHz clock signal.

The main purpose of oscillator 35 is to provide a stable clock to the counters programmed in the PAL. This AND gate 34 acts as a switch which is activated, allowing the clock signal through, only when the TRIGGER_IN_LATCHED signal is a logical high. The output of the first AND gate 34 is sent to the clock input of a first N-Bit Counter 36. The size in bits (N) of the counter 36 depends on the sum of: 1) the length of time delay required between the initial triggering of the control circuitry by the sensor 10 and the time the first image is desired; and 2) the length time the camera 20 is to acquire images.

The output of the N-Bit Counter 36 is sent to a first delay generation logic section 38. The first delay generation logic section 38 contains logic that utilizes one of ten user defined/jumper selectable preprogrammed delay times. The delay time selected is actually the number of counter transitions that must occur before allowing the output of this logic section to become a high logic state. The counter 38 starts at zero and will only start incrementing once the oscillator clock signal is enabled via the first AND gate 34. Once the N-Bit Counter 36 reaches the time delay value selected by the user, a high pulse is output from the first delay generation logic 38 and fed into the clock input of a second D flip-flop 40.

Once again the D-input of the flip-flop 40 is permanently connected to a logical high source. Therefore, the rising edge of the first delay generation logic output will permanently latch an output signal of the second flip-flop 40 high. The latched signal is labeled DELAYED_TRIG_OUT. The rising edge of DELAYED_TRIG_OUT signifies the beginning of the camera activation window. The next step in the control circuitry is to create an additional delay signal.

The DELAYED_TRIG_OUT signal is input to a second two-input AND gate 42. The other input of the AND gate 42 is a clock signal from oscillator 35. The output of the AND gate 42 is sent to the clock input of a second N-Bit Counter 44. The size in bits (N) of the second N-Bit Counter 44 depends upon the maximum possible length of the activation window required by the video camera 22. The N-Bit output of this counter 44 is output to a second delay generation logic block 46. This section contains logic that utilizes user selectable preprogrammed delay times. The delay time selected is actually the number of counter transitions that must occur before allowing the output of this logic section 46 to generate a logical high signal. The counter 44 starts at zero and will only start incrementing once the input clock is enabled via the second AND gate 42.

Once the N-Bit Counter 44 reaches the time delay value selected by the user, a high pulse is output from the delay logic 46 and fed into the clock input of a third D-flip-flop 48.

Once again the D-input of the flip-flop 48 is permanently connected to a logical high source. Therefore, this rising edge will latch the output of the flip-flop 48 to a high signal. The latched signal is labeled SECOND_DELAY. The rising edge of the SECOND_DELAY signifies the end of the camera activation window.

Each of the DELAYED_TRIG_OUT and SECOND_DELAY are fed to the two inputs of an exclusive-OR gate 50 which produces a high pulse (activation window) which is high from the time the DELAYED_TRIG_OUT goes high to the time the SECOND_DELAY goes high. The exclusive OR output is provided to a third AND gate 52 with an externally generated square wave signal from a second function generator 51. The frequency of the square wave signal dictates the number of pulses that will occur in the activation window and hence the number of times the camera will be gated. Typically, it is desirable to capture three to ten frames during passage of the projectile. The output signal, labeled WINDOW_OF_PULSES, is buffered via a separate non-inverting buffer 53 whose open collector is pulled up to a logical high and then sent to the camera trigger.

When programmed correctly, the video camera 20 will be enabled by the activation window at the exact moment the projectile 14 passes the lens of the video camera 20.

The above circuitry provides an accurate and inexpensive method to control an underwater video camera 20 for high speed photographic imaging purposes. The circuitry is programmable which provides flexibility and greatly minimizes the need for circuit modifications as test requirements and conditions (i.e., projectile speed) vary.

Finally, it is anticipated that the invention herein will have far reaching applications other than those of underwater projectile testing projects.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A high speed video photography system for photographing a projectile comprising:
   a video camera having a gate input and positioned to view passage of said projectile;
   a sensor providing a sensor signal on detection of the passage of said projectile; and
   a control circuit joined to said sensor and to said video camera gate input, said control circuit providing a control signal to said video camera gate input to activate said video camera a predetermined time after said sensor provides said sensor signal to said control circuit wherein said control circuit comprises:
   a sensor conditioning circuit joined to said sensor and providing a trigger in signal output;
   a first latch joined to said sensor conditioning circuit and providing a latched trigger in signal output;
   a first oscillator providing a first timing signal;
   a first AND gate joined to receive said latched trigger in signal from said first latch and said first timing signal from said first oscillator, said first AND gate providing a latched timing signal when said latched trigger in signal is asserted;
   a first counter joined to receive said latched timing signal from said first AND gate and providing a first counter output;

a first delay generation logic circuit joined to receive said first counter output and preselected delay count, said first delay generation logic circuit providing an asserted first delay logic signal when said first counter output exceeds said preselected delay count;

a second latch joined to said first delay generation logic circuit and receiving said asserted first delay logic signal and providing a latched first delay signal;

a second AND gate joined to said first oscillator and receiving said first timing signal and said second latch and receiving said latched first delay signal, said second AND gate providing a second latched timing signal when said latched first delay signal is asserted;

a second counter joined to receive said second latched timing signal from said second AND gate and providing a second counter output;

a second delay generation logic circuit joined to receive said second counter output and second preselected delay count, said second delay generation logic circuit providing an asserted second delay logic signal when said second counter output exceeds said second preselected delay count;

a third latch joined to said second delay generation logic circuit and receiving said asserted second delay logic signal and providing a latched second delay signal;

an exclusive OR gate joined to said second latch and receiving said latched first delay signal and joined to said third latch and receiving said latched second delay signal, said exclusive OR gate providing an asserted trigger out signal when only one of latched first delay and latched second delay signals is asserted;

a second oscillator providing a second timing signal;

a third AND gate joined to said exclusive OR gate output to receive said exclusive OR trigger out signal and joined to said second oscillator to output said second timing signal when said exclusive OR trigger out signal is asserted; and a buffer joined to said third AND gate, receiving said second timing signal and providing a buffered control signal to said video camera gate input.

2. The system of claim 1, wherein said first, second and third latches are d flip-flops.

3. The system of claim 2 wherein said first latch, said second latch, said third latch, said first counter, said second counter, said first delay logic, said second delay logic, said first AND gate, said second AND gate, said exclusive OR gate, and said third AND gate are programmed on a programmable array logic circuit.

4. The system of claim 1 wherein said first oscillator provides a timing signal having a frequency of 1 Megahertz.

5. The system of claim 1 further comprising at least one plate having an aperture therethrough, said aperture being alignable with a path of said projectile, and said sensor being positioned on said plate at said aperture for detecting the passage of said projectile through said aperture.

6. The system of claim 5 further comprising a light source positioned to illuminate said projectile as it passes said video camera.

7. A system for controlling a video camera comprising:

a sensor positioned for detecting an event;

a sensor conditioning circuit joined to said sensor and providing a trigger in signal output;

a first latch joined to said sensor conditioning circuit and providing a latched trigger in signal output;

a first oscillator providing a first timing signal;

a first AND gate joined to receive said latched trigger in signal from said first latch and said first timing signal from said first oscillator, said first AND gate providing a latched timing signal when said latched trigger in signal is asserted;

a first counter joined to receive said latched timing signal from said first AND gate and providing a first counter output;

a first delay generation logic circuit joined to receive said first counter output and preselected delay count;

said first delay generation logic circuit providing an asserted first delay logic signal when said first counter output exceeds said preselected delay count;

a second latch joined to said first delay generation logic circuit and receiving said asserted first delay logic signal and providing a latched first delay signal;

a second AND gate joined to said first oscillator and receiving said first timing signal and said second latch and receiving said latched first delay signal, said second AND gate providing a second latched timing signal when said latched first delay signal is asserted;

a second counter joined to receive said second latched timing signal from said second AND gate and providing a second counter output;

a second delay generation logic circuit joined to receive said second counter output and second preselected delay count, said second delay generation logic circuit providing an asserted second delay logic signal when said second counter output exceeds said second preselected delay count;

a third latch joined to said second delay generation logic circuit and receiving said asserted second delay logic signal and providing a latched second delay signal;

an exclusive OR gate joined to said second latch and receiving said latched first delay signal and joined to said third latch and receiving said latched second delay signal, said exclusive OR gate;

providing an asserted trigger out signal when only one of latched first delay and latched second delay signals is asserted;

a second oscillator providing a second timing signal;

a third AND gate joined to said exclusive OR gate output to receive said exclusive OR trigger out signal and joined to said second oscillator to output said second timing signal when said exclusive OR trigger out signal is asserted; and a buffer joined to said third AND gate, receiving said second timing signal and providing a buffered control signal to said video camera.

8. The system of claim 7 wherein said first, second and third latches are d flip-flops.

9. The system of claim 8 wherein said first latch, said second latch, said third latch, said first counter, said second counter, said first delay logic, said second delay logic, said first AND gate, said second AND gate, said exclusive OR gate, and said third AND gate are programmed on a programmable array logic circuit.

* * * * *